United States Patent
Saito et al.

(10) Patent No.: US 11,106,151 B2
(45) Date of Patent: Aug. 31, 2021

(54) CHARGING ROLL FOR ELECTROPHOTOGRAPHIC EQUIPMENT

(71) Applicant: Sumitomo Riko Company Limited, Aichi (JP)

(72) Inventors: Yoshihiro Saito, Aichi (JP); Hiroshi Ukai, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 17/165,968

(22) Filed: Feb. 3, 2021

(65) Prior Publication Data
US 2021/0157252 A1    May 27, 2021

Related U.S. Application Data

(63) Continuation of application No. PCT/JP2020/002202, filed on Jan. 23, 2020.

(30) Foreign Application Priority Data

Jan. 30, 2019 (JP) .............................. JP2019-014443

(51) Int. Cl.
*G03G 15/02* (2006.01)

(52) U.S. Cl.
CPC ... *G03G 15/0233* (2013.01); *G03G 2215/021* (2013.01)

(58) Field of Classification Search
CPC .................. G03G 15/0233; G03G 2215/021
See application file for complete search history.

(56) References Cited

U.S. PATENT DOCUMENTS

| 10,551,763 B2* | 2/2020 | Yoshida | G03G 15/0233 |
| 2018/0024460 A1* | 1/2018 | Uematsu | G03G 15/0233 399/176 |
| 2018/0275552 A1 | 9/2018 | Satoh et al. | |
| 2019/0271931 A1* | 9/2019 | Kuroda | B32B 25/14 |

FOREIGN PATENT DOCUMENTS

JP    2018060162    4/2018

OTHER PUBLICATIONS

"International Search Report (Form PCT/ISA/210) of PCT/JP2020/002202," dated Mar. 17, 2020, with English translation thereof, pp. 1-5.

* cited by examiner

*Primary Examiner* — Joseph S Wong
(74) *Attorney, Agent, or Firm* — JCIPRNET

(57) ABSTRACT

In a charging roll for electrophotographic equipment, an outer surface layer of an elastic layer includes a binder resin, large-diameter particles having an average particle diameter of 15-50 μm, and small-diameter particles having an average particle diameter of 3-15 μm, a difference in average particle diameter between the large-diameter particles and the small-diameter particles is 10-35 μm, the small-diameter particles are arranged in one layer in the surface layer, the average distance between the small-diameter particles is not more than 1.2 times the average particle diameter of the small-diameter particles, the thickness a of the binder resin covering the large-diameter particles is within the range of 1.5-3.5 μm, the thickness b of the binder resin covering the small-diameter particles is 3.0-6.0 μm, and the thickness b is larger than the thickness a.

1 Claim, 3 Drawing Sheets

CHARGING ROLL FOR ELECTROPHOTOGRAPHIC EQUIPMENT

CROSS-REFERENCE TO RELATED APPLICATIONS

This application is a Continuation of PCT International Application No. PCT/JP2020/002202 filed on Jan. 23, 2020, which claims priority under 35 U.S.C. § 119(a) to Japanese Patent Application No. 2019-014443 filed on Jan. 30, 2019. The above application is hereby expressly incorporated by reference, in its entirety, into the present application.

TECHNICAL FIELD

The disclosure relates to a charging roll for electrophotographic equipment which is suitably used in electrophotographic equipment, such as a copier, a printer, and a facsimile, which adopts an electrophotographic method.

BACKGROUND ART

In electrophotographic equipment, as a method of charging a surface of a photoconductor, a contact charging method is known in which a charging roll is brought into direct contact with the surface of the photoconductor. In the contact charging method, in a case where a discharge region is narrow, charging may be concentrated locally to cause image defects. Therefore, for example, as described in Patent Literature 1, particles are added to a surface layer of the charging roll to provide irregularities on the surface, so that a discharge region is secured and a charge amount is maintained. In addition, in Patent Literature 1, two types of particles having different sizes are added to the surface layer of the charging roll to secure a charge amount and charging uniformity.

CITATION LIST

Patent Literature

[Patent Literature 1]
Patent Literature 1: Japanese Patent Laid-open No. 2018-60162

In electrophotographic equipment that has a long life and can print at a higher speed, even if two types of particles of different sizes are added to a surface layer of a charging roll to secure a discharge region while securing a charge amount and charging uniformity, abnormal images such as an image with horizontal stripes, an image with unevenness, and an image with fog may be generated at the end of life.

The disclosure provides a charging roll for electrophotographic equipment which can provide a high-quality image at the end of life even in a high-speed machine having a long life.

SUMMARY OF INVENTION

According to an aspect of the disclosure, there is provided a charging roll for electrophotographic equipment including a shaft body, an elastic layer formed on an outer periphery of the shaft body, and a surface layer formed on an outer periphery of the elastic layer, in which the surface layer includes a binder resin, large-diameter particles having an average particle diameter of 15-50 μm, and small-diameter particles having an average particle diameter of 3-15 μm; a difference in average particle diameter between the large-diameter particles and the small-diameter particles is 10-35 μm; the small-diameter particles are arranged in one layer in the surface layer, and the average distance between the small-diameter particles is not more than 1.2 times the average particle diameter of the small-diameter particles; the thickness a of the binder resin covering the large-diameter particles is within the range of 1.5-3.5 μm; the thickness b of the binder resin covering the small-diameter particles is within the range of 3.0-6.0 μm; and the thickness b is larger than the thickness a.

According to another aspect of the disclosure, the large-diameter particles and the small-diameter particles be made of the same material, and the large and small particles and the binder resin be made of different materials. A content of the small-diameter particles is within the range of 60-110 parts by mass with respect to 100 parts by mass of the binder resin. The material of the large and small particles is any one of polyurethane, polyamide, acrylic resin, and polycarbonate. The material of the binder resin is any one or more of polyurethane, polyamide, acrylic resin, and polycarbonate. A surface roughness Ra of the large and small particles is 0.25 μm or less.

DESCRIPTION OF EMBODIMENTS

In the charging roll for electrophotographic equipment according to the disclosure, the surface layer includes the large and small particles, in which a difference in particle diameter between the large and small particles is within a specific range; the small-diameter particles are arranged in one layer in the surface layer, and the average distance between the small-diameter particles is not more than 1.2 times the average particle diameter of the small-diameter particles; the thickness a of the binder resin covering the large-diameter particles and the thickness b of the binder resin covering the small-diameter particles are respectively within specific ranges; and the thickness b is larger than the thickness a, so that it is possible to provide a high-quality image at the end of life even in a high-speed machine having a long life.

Hereinafter, the disclosure will be described in detail.

Figure 1:
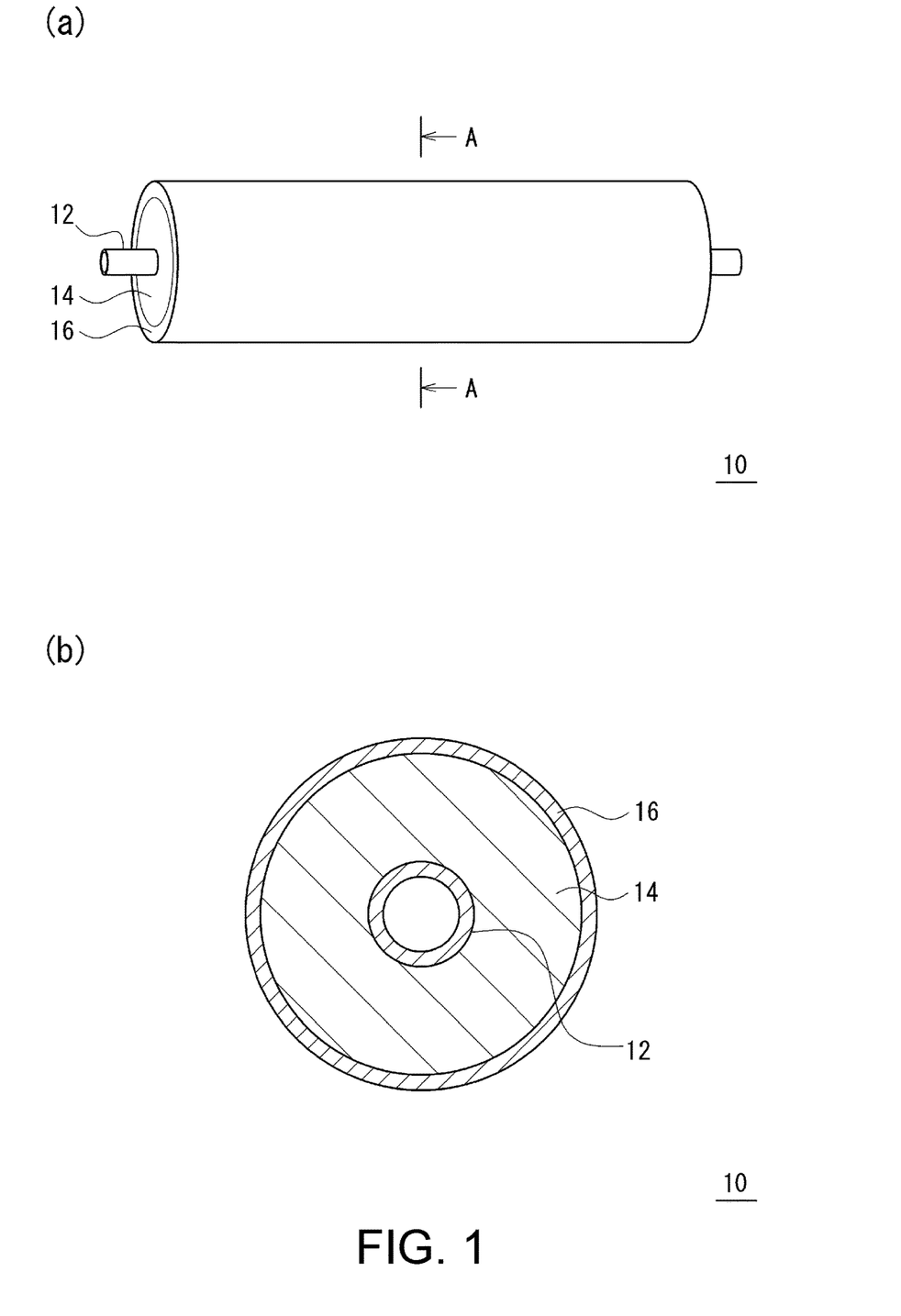
FIG. 1 illustrates a schematic external view (a) of a charging roll for electrophotographic equipment according to an embodiment of the disclosure, and a sectional view (b) taken along the line A-A therein.
Figure 2:
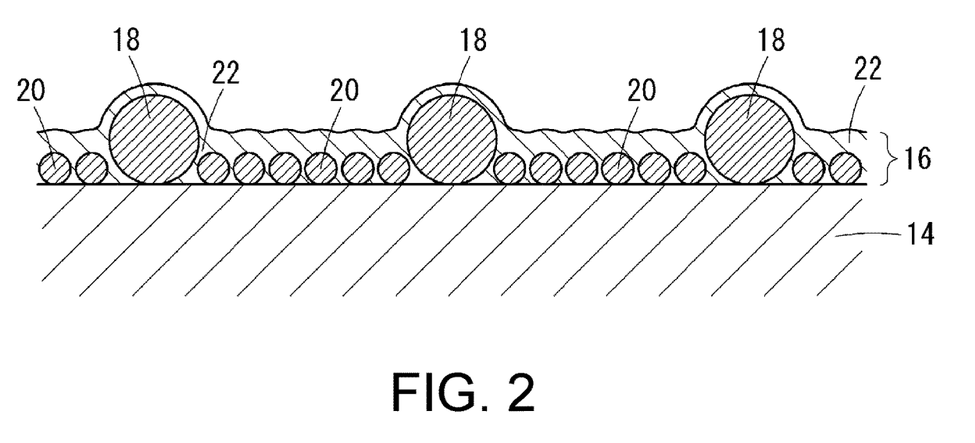
FIG. 2 illustrates an enlarged schematic view of the vicinity of the surface of the charging roll for electrophotographic equipment illustrated in FIG. 1.
Figure 3:
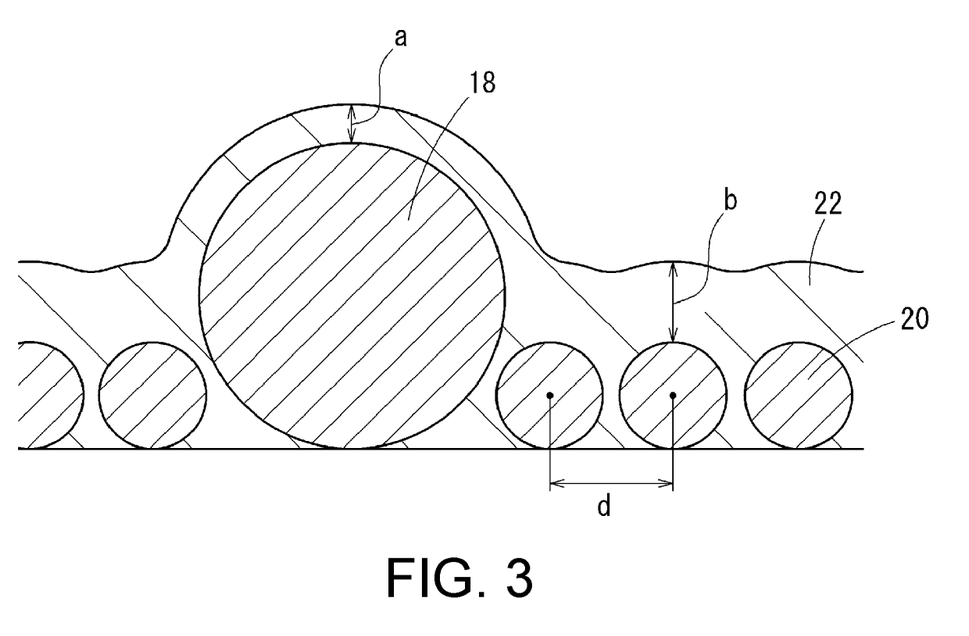
FIG. 3 illustrates an enlarged schematic view obtained by further enlarging the enlarged schematic view illustrated in FIG. 2.

The charging roll for electrophotographic equipment according to the disclosure (hereinafter also referred to simply as charging roll) will be described in detail. FIG. 1 illustrates a schematic external view (a) of a charging roll for electrophotographic equipment according to an embodiment of the disclosure, and a sectional view (b) taken along the line A-A therein. FIG. 2 illustrates an enlarged schematic view of the vicinity of the surface of the charging roll for electrophotographic equipment illustrated in FIG. 1. FIG. 3 illustrates an enlarged schematic view obtained by further enlarging the enlarged schematic view illustrated in FIG. 2.

A charging roll 10 includes a shaft body 12, an elastic layer 14 formed on an outer periphery of the shaft body 12, and a surface layer 16 formed on an outer periphery of the elastic layer 14. The elastic layer 14 is a layer that serves as a base of the charging roll 10. The surface layer 16 is a layer that appears on a surface of the charging roll 10.

The surface layer 16 includes a binder resin 22, large-diameter particles 18, and small-diameter particles 20. The large-diameter particles 18 and the small-diameter particles 20 form irregularities on a surface of the surface layer 16. The portion where the large-diameter particles 18 are present is a relatively large convex part, and the portion where the small-diameter particles 20 are present is a relatively small convex part. One or more relatively small convex parts are arranged between the relatively large convex parts. The relatively large convex part where the large-diameter particles 18 are present is a portion that comes into contact with a photoconductor, and the relatively small convex part where the small-diameter particles 20 are present is a portion that does not come into contact with the photoconductor. Shapes of the large-diameter particles 18 and the small-diameter particles 20 are not particularly limited and are preferably spherical, true spherical, or the like.

The large-diameter particles 18 are particles having an average particle diameter of 15-50 μm. Inclusion of such large-diameter particles 18 causes the surface layer 16 to have sufficiently large surface irregularities, so that the surface layer 16 can sufficiently secure a gap between itself and a photoconductor. As a result, discharge performance is improved, which makes it possible to secure high chargeability. In a case where the average particle diameter of the large-diameter particles 18 is less than 15 μm, the surface layer 16 cannot sufficiently secure a gap between itself and a photoconductor, which does not make it possible to secure high chargeability. In addition, in a case where the average particle diameter of the large-diameter particles 18 is more than 50 μm, charging uniformity cannot be satisfied. The average particle diameter of the large-diameter particles 18 is more preferably 20 μm or more and still more preferably 25 μm or more, from the viewpoint that a gap between the large-diameter particles 18 and a photoconductor can be increased and the like. In addition, the average particle diameter of the large-diameter particles 18 is more preferably 45 μm or less and still more preferably 40 μm or less, from the viewpoint that charging uniformity is easily increased and the like. The average particle diameter of the large-diameter particles 18 is a median diameter measured by a laser diffraction/scattering particle size distribution measuring apparatus.

The large-diameter particles 18 are preferably resin particles. As the material of the resin particles, polyurethane, polyamide, acrylic resin, polycarbonate, and the like may be exemplified. The large-diameter particles 18 are preferably made of one type of material. The material of the large-diameter particles 18 is preferably any one of the materials for the resin particles. These are resins with dipoles, and thus are easily charged.

A content of the large-diameter particles 18 is not particularly limited, and is preferably within the range of 5-40 parts by mass with respect to 100 parts by mass of the binder resin 22, from the viewpoint that an appropriate distance between the large-diameter particles 18 is easily secured, charging uniformity is easily increased, and the like. The content is more preferably within the range of 5-35 parts by mass, and still more preferably within the range of 10-30 parts by mass.

The large-diameter particles 18 are preferably particles having a small surface roughness Ra. Specifically, the surface roughness Ra is preferably 0.25 μm or less. The surface roughness Ra is more preferably 0.20 μm or less and still more preferably 0.15 μm or less. The surface roughness Ra is arithmetic mean roughness. A smaller surface roughness Ra of the large-diameter particles 18 makes variation in the shape and size of the particles smaller and makes it easier to adjust a thickness using surface energy, which will be described later.

The average distance between the large-diameter particles 18 is preferably 60 μm or more. In this case, an amount of the large-diameter particles 18 becomes appropriate, and charging uniformity is easily increased. In addition, from this viewpoint, the average distance between the large-diameter particles 18 is more preferably 80 μm or more and still more preferably 100 μm or more. In addition, from the viewpoint that an amount of the large-diameter particles 18 becomes appropriate, charging uniformity is easily improved, and the like, the average distance between the large-diameter particles 18 is preferably 300 μm or less. The average distance between the large-diameter particles 18 is more preferably 250 μm or less and still more preferably 200 μm or less. The average distance between the large-diameter particles 18 is expressed by taking a surface photograph of the surface layer 16, measuring a distance between the large-diameter particles 18 at any five places in which the measurement is made three times for each place, and calculating the average of the 15 scores in total. The distance between the large-diameter particles 18 is expressed by a distance between their outer peripheries facing each other.

The large-diameter particles 18 preferably have a small deformation amount with respect to a load, from the viewpoint that a gap between the large-diameter particles 18 and a photoconductor is easily maintained and the like. For example, in a case where a load of 50 mN is applied thereto, the deformation amount is preferably 80% or less. The deformation amount is more preferably 70% or less and still more preferably 60% or less. On the other hand, from the viewpoint that flexibility is ensured and the like, the deformation amount is preferably 10% or more. The deformation amount is more preferably 20% or more.

From the viewpoint that it is easy to uniformly maintain a gap between the large-diameter particles 18 and a photoconductor, and the like, it is preferable that the large-diameter particles 18 and the large-diameter particles 18 exist without forming an aggregate.

The small-diameter particles 20 are particles having an average particle diameter of 3-15 μm. The convex part of the portion where the small-diameter particles 20 are present is a starting point of discharge. Inclusion of the small-diameter particles 20 causes the surface layer 16 to secure a starting point of discharge, and dispersion of the small-diameter particles 20 can satisfy charging uniformity. In a case where the average particle diameter of the small-diameter particles 20 is less than 3 μm, the convex part of the portion where the small-diameter particles 20 are present is too small to be a starting point of discharge, and charging uniformity cannot be satisfied. In addition, in a case where the average particle diameter of the small-diameter particles 20 is more than 15 μm, the convex part of the portion where the small-diameter particles 20 are present is too large to be a starting point of discharge, and charging uniformity cannot be satisfied. The average particle diameter of the small-diameter particles 20 is more preferably 4 μm or more and still more preferably 5 μm or more, from the viewpoint that charging uniformity is improved and the like. In addition, the average particle diameter of the small-diameter particles 20 is more preferably 10 μm or less and still more preferably 7 μm or less. The average particle diameter of the small-diameter particles 20 is a median diameter measured by a laser diffraction/scattering particle size distribution measuring apparatus.

The small-diameter particles 20 are preferably resin particles. As the material of the resin particles, polyurethane, polyamide, acrylic resin, polycarbonate, and the like may be exemplified. The material of the small-diameter particles 20 is preferably the same as that of the large-diameter particles 18. The small-diameter particles 20 are preferably made of one type of material. The material of the small-diameter particles 20 is preferably any one of the materials for the resin particles. These are resins with dipoles, and thus are easily charged. The material of the small-diameter particles 20 is the same as that of the large-diameter particles 18, and the large and small particles are all easily charged particles; as a result, as described later, in the surface layer 16, the particles repel each other, and the particles and the binder resin 22 are easily bonded to each other. Thus, the small-diameter particles 20 can be easily arranged in one layer.

The small-diameter particles 20 are preferably particles having a small surface roughness Ra. Specifically, the surface roughness Ra is preferably 0.25 µm or less. The surface roughness Ra is more preferably 0.20 µm or less and still more preferably 0.15 µm or less. The surface roughness Ra is an arithmetic mean roughness. A smaller surface roughness Ra of the small-diameter particles 20 makes variation in the shape and size of the particles smaller and makes it easier to adjust a thickness using surface energy, which will be described later.

The small-diameter particles 20 are arranged in one layer in the surface layer 16. The fact that such particles are arranged in one layer in the surface layer 16 means that there are no particles that overlap each other in a thickness direction. The small-diameter particles 20 are densely arranged in one layer in the surface layer 16, and the average distance between the small-diameter particles 20 is 1.2 times or less the average particle diameter of the small-diameter particles 20. A distance between the small-diameter particles 20 is expressed by distance d between the centers of the small-diameter particles 20. The average distance between the small-diameter particles 20 is expressed by taking a surface photograph of the surface layer 16, measuring a distance between the small-diameter particles 20 at any five places in which the measurement is made three times for each place, and calculating the average of the 15 scores in total. A surface of the roll may become worn or scraped over time; however, in a case where the small-diameter particles 20 are arranged in one layer in the surface layer 16, uneven wear or scraping is suppressed, and thus an effect thereof on the charge of a photoconductor is decreased. In addition, in a case where the small-diameter particles 20 are densely arranged in one layer in the surface layer 16, many convex parts caused by the small-diameter particles 20 are generated on a surface of the surface layer 16, so that a flat portion of the surface layer 16 can be decreased to suppress uneven charging (uneven discharge).

In order to arrange the small-diameter particles 20 in one layer in the surface layer 16, the same material may be used for the large and small particles, and different materials may be used for the large and small particles and the binder resin 22. In a case where different materials are used for the large and small particles and the binder resin 22, friction occurs when a surface layer forming composition (liquid) as described later is stirred, so that the particles and the binder resin 22 are respectively charged. As a result, the particles made of the same material repel each other, and the particles and the binder resin 22, which are made of different materials, are easily electrostatically bonded to each other. Therefore, the small-diameter particles 20 can be arranged in one layer in the surface layer 16. In addition, since the small-diameter particles 20 repel each other, aggregation of the small-diameter particles 20 is suppressed.

When the surface layer forming composition (liquid) is stirred, in order to cause the particles and the binder resin 22 to be easily respectively charged and cause the small-diameter particles 20 to be easily arranged in the surface layer 16 in one layer, a higher stirring speed may be used in addition to using different materials for the large and small particles and the binder resin 22. Specifically, the stirring speed may be set to a more preferable range as described later. In addition, in order to keep the particles and the binder resin 22 in a charged state, the surface layer forming composition (liquid) may be applied, with stirring, to an outer periphery of the elastic layer 14. In addition, at the time of application, humidity of the surface layer forming composition (liquid) may be controlled. Specifically, the humidity is preferably controlled to low and constant humidity.

In order to arrange the small-diameter particles 20 densely in the surface layer 16, a large content of the small-diameter particles 20 may be used and the average distance between the small-diameter particles 20 may be decreased. On the other hand, in a case where a too large content of the small-diameter particles 20 is used, it becomes difficult to arrange the small-diameter particles 20 in one layer in the surface layer 16 even if the particles repel each other. From this viewpoint, the content of the small-diameter particles 20 is preferably within the range of 60-110 parts by mass with respect to 100 parts by mass of the binder resin 22. The content is more preferably within the range of 60-100 parts by mass, and still more preferably within the range of 60-80 parts by mass.

A difference in average particle diameter between the large-diameter particles 18 and the small-diameter particles 20 is 10-35 µm. In a case where the difference in average particle diameter is sufficiently large, that is, 10 µm or more, the optimum discharge distance can be maintained until the end of life. In addition, from this viewpoint, the difference in average particle diameter is more preferably 15 µm or more and still more preferably 20 µm or more. On the other hand, in a case where the difference in average particle diameter is 35 µm or less, fog can be suppressed. In addition, from this viewpoint, the difference in average particle diameter is more preferably 30 µm or less and still more preferably 25 µm or less.

For the binder resin 22, a material suitable for use as a material for the surface layer is selected. As the binder resin 22, polyurethane, polyamide, acrylic resin, polycarbonate, and the like may be exemplified. As described above, the binder resin 22 is preferably made of a material different from that of the large and small particles. The binder resin 22 may be any one of the above resins or may be a combination of two or more thereof, as long as the binder resin 22 is made of a material different from that of the large and small particles.

In the surface layer 16, the binder resin 22 has a predetermined thickness. The thickness a of the binder resin 22 covering the large-diameter particles 18 is within the range of 1.5-3.5 µm, and the thickness b of the binder resin 22 covering the small-diameter particles 20 is within the range of 3.0-6.0 µm. In addition, the thickness b is larger than the thickness a. The thickness of the binder resin 22 can be measured by observing a cross section thereof using a laser microscope (for example, "VK-9510" manufactured by KEYENCE CORPORATION). For example, the thicknesses a and b of the binder resin 22 can be respectively represented by measuring each of the thicknesses a and b of the binder resin 22 at five places in any positions and calculating the average thereof.

In a case where the thickness a of the binder resin 22 covering the large-diameter particles 18 is too larger than a specific range, insufficient discharge and poor charging occur due to an increase in nip area with a photoconductor. As a result, an image with horizontal stripes is generated. In addition, in a case where the thickness a is too smaller than the specific range, the optimum distance to the photoconductor cannot be maintained at the end of life due to wear over time. As a result, an image with black dots is generated. In a case where the thickness b of the binder resin 22 covering the small-diameter particles 20 is too larger than a specific range, a discharge region cannot be secured. As a result, an image with unevenness is generated. In addition, in a case where the thickness b is too smaller than the specific range, resistance at discharge places becomes non-uniform so that uniform chargeability cannot be ensured. As a result, an image with horizontal stripes is generated. Even if the thicknesses a and b of the binder resin 22 are within respective specific ranges, in a case where the thickness b is not larger than the thickness a, an amount of discharge cannot be the same at positions on the large and small particles, and thus uniform chargeability cannot be ensured. As a result, an image with black dots is generated. This is because due to being in contact with the photoconductor, the portion where the large-diameter particles 18 are present is inferior in an amount of discharge to the portion where the small-diameter particles 20 are present. In order to achieve the same amount of discharge at positions on the large and small particles, it is necessary to increase capacitance and increase an amount of charge on the surface by causing the portion where the large-diameter particles 18 are present to have a smaller thickness than the portion where the small-diameter particles 20 are present.

From the aforementioned viewpoint, the thickness a of the binder resin 22 covering the large-diameter particles 18 is more preferably within the range of 1.7-3.2 µm, and still more preferably within the range of 2.0-3.0 µm. In addition, the thickness b of the binder resin 22 covering the small-diameter particles 20 is more preferably within the range of 3.2-5.0 µm, and still more preferably within the range of 3.5-4.5 µm.

A difference between the thickness b and the thickness a is preferably 1.0 µm or more. More preferably, the difference is 1.5 µm or more. The larger the difference between the thickness b and the thickness a, an amount of charge on the surface of the binder resin 22 covering the large-diameter particles 18 becomes relatively larger, and a range of environments in which an image with black dots is not generated is wider (for example, generation of an image with black dots can be suppressed even in an environment at 0° C. and 10% RH).

The thicknesses a and b of the binder resin 22 can be adjusted to the above-mentioned specific ranges by utilizing a difference in surface energy between the large and small particles. In addition, the thickness b can be made larger than the thickness a by utilizing the difference in surface energy between the large and small particles. Since the particles having a larger surface energy attract more of the binder resin 22, the thickness of the binder resin 22 on the particles can be made larger. Therefore, by making the surface energy of the small-diameter particles 20 larger than the surface energy of the large-diameter particles 18, it is possible to adjust the thickness b to the above-mentioned specific range and make the thickness b larger than the thickness a. The surface energy of the particles can be adjusted depending on type of material, particle diameter, humidity environment at the time of surface layer production, and the like. In a case where the large and small particles are made of the same material, the surface energy of the small-diameter particles 20 having a larger curvature is larger. By keeping the surface layer forming composition as described later at low and constant humidity at the time of surface layer production, an energy status is not susceptible to humidity so that the thickness can be adjusted by utilizing a difference in surface energy. In addition, by applying the surface layer forming composition as described later with stirring, the thickness can be adjusted by utilizing a difference in surface energy.

The surface layer 16 may or may not include an additive in addition to the binder resin 22, the large-diameter particles 18, and the small-diameter particles 20. As the additive, a conductive agent, a stabilizer, an ultraviolet absorber, a lubricant, a releasing agent, a dye, a pigment, a flame retardant, and the like may be exemplified. As the conductive agent, an ionic conductive agent (quaternary ammonium salt or the like), an electronic conductive agent (carbon black or the like), and the like may be exemplified.

The surface layer 16 can be adjusted to have a predetermined volume resistivity by type of material, blending of the conductive agent, and the like. The volume resistivity of the surface layer 16 may be appropriately set in the range of $10^5$-$10^{11}$ Ω·cm, $10^8$-$10^{10}$ Ω·cm, or the like, depending on the intended use or the like.

The surface layer 16 may be formed by applying a surface layer forming composition, which contains the binder resin 22, the large-diameter particles 18, and the small-diameter particles 20, to an outer peripheral surface of the elastic layer 14, and performing drying, curing, and the like in an appropriate manner. In the surface layer forming composition, the binder resin 22, the large-diameter particles 18, and the small-diameter particles 20 may be prepared as a dispersion liquid using a dispersion medium. As the dispersion medium, ketone-based solvents such as methyl ethyl ketone (MEK) and methyl isobutyl ketone, alcohol-based solvents such as isopropyl alcohol (IPA), methanol, and ethanol, hydrocarbon-based solvents such as hexane and toluene, acetic acid-based solvents such as ethyl acetate and butyl acetate, ether-based solvents such as diethyl ether and tetrahydrofuran, water, and the like may be exemplified.

The surface layer forming composition may be prepared by mixing the binder resin 22, the large-diameter particles 18, the small-diameter particles 20, an additive that is added if necessary, and a dispersion medium, and stirring the mixture. A stirring speed for the surface layer forming composition is preferably 350 rpm or more. More preferably, the stirring speed is 450 rpm or more. In addition, a viscosity (18° C.) of the surface layer forming composition at the time of stirring is preferably 30-80 cps. More preferably, the viscosity is 35-70 cps. In addition, it is preferable that the surface layer forming composition be continuously stirred even during application thereof to an outer peripheral surface of the elastic layer 14. That is, it is preferable that the surface layer forming composition be applied, with stirring, to the outer peripheral surface of the elastic layer 14. During application of the surface layer forming composition, it is preferable to control humidity. Specifically, the humidity is preferably controlled to low and constant humidity.

The elastic layer 14 includes crosslinked rubber. The elastic layer 14 is formed of a conductive rubber composition containing uncrosslinked rubber. The crosslinked rubber can be obtained by crosslinking the uncrosslinked rubber. The uncrosslinked rubber may be polar rubber or non-polar rubber. The uncrosslinked rubber is preferably polar rubber from the viewpoint of having excellent conductivity and the like.

The polar rubber is rubber having a polar group, and examples of the polar group include a chloro group, a nitrile group, a carboxyl group, an epoxy group, and the like. Specific examples of the polar rubber include hydrin rubber, nitrile rubber (NBR), urethane rubber (U), acrylic rubber (copolymer of acrylic acid ester and 2-chloroethyl vinyl ether, ACM), chloroprene rubber (CR), epoxidized natural rubber (ENR), and the like. Among the polar rubber, hydrin rubber and nitrile rubber (NBR) are more preferable from the viewpoint that a particularly low volume resistivity is easily achieved and the like.

As hydrin rubber, epichlorohydrin homopolymer (CO), epichlorohydrin-ethylene oxide binary copolymer (ECO), epichlorohydrin-allyl glycidyl ether binary copolymer (GCO), and epichlorohydrin-ethylene oxide-allyl glycidyl ether terpolymer (GECO), and the like may be exemplified.

As the urethane rubber, polyether type urethane rubber having an ether bond in the molecule may be exemplified. The polyether type urethane rubber may be produced by reacting polyether having hydroxyl groups at both ends with diisocyanate. The polyether is not particularly limited and examples thereof include polyethylene glycol, polypropylene glycol, and the like. The diisocyanate is not particularly limited and examples thereof include tolylene diisocyanate, diphenylmethane diisocyanate, and the like.

As the non-polar rubber, isoprene rubber (IR), natural rubber (NR), styrene butadiene rubber (SBR), butadiene rubber (BR), and the like may be exemplified.

As the crosslinking agent, a sulfur crosslinking agent, a peroxide crosslinking agent, a dechlorination crosslinking agent, and the like may be exemplified. These crosslinking agents may be used alone, or two or more thereof may be used in combination.

As the sulfur crosslinking agent, conventionally known sulfur crosslinking agents such as powdered sulfur, precipitated sulfur, colloidal sulfur, surface-treated sulfur, insoluble sulfur, sulfur chloride, thiuram-based vulcanization accelerator, polymeric polysulfide, and the like may be exemplified.

As the peroxide crosslinking agent, conventionally known peroxide crosslinking agents such as peroxy ketal, dialkyl peroxide, peroxy ester, ketone peroxide, peroxy dicarbonate, diacyl peroxide, hydroperoxide, and the like may be exemplified.

As the dechlorination crosslinking agent, a dithiocarbonate compound may be exemplified. More specifically, as the dechlorination crosslinking agent, quinoxaline-2,3-dithiocarbonate, 6-methylquinoxaline-2,3-dithiocarbonate, 6-isopropylquinoxaline-2,3-dithiocarbonate, 5,8-dimethylquinoxaline-2,3-dithiocarbonate, and the like may be exemplified.

An amount of the crosslinking agent blended is preferably in the range of 0.1-2 parts by mass, more preferably in the range of 0.3-1.8 parts by mass, and still more preferably in the range of 0.5-1.5 parts by mass, with respect to 100 parts by mass of uncrosslinked rubber, from the viewpoint that bleeding hardly occurs and the like.

In a case where the dechlorination crosslinking agent is used as a crosslinking agent, a dechlorination crosslinking accelerator may be used in combination therewith. As the dechlorination crosslinking accelerator, 1,8-diazabicyclo[5.4.0] undecen-7 (hereinafter, abbreviated as DBU) or a weak acid salt thereof may be exemplified. Although the dechlorination crosslinking accelerator may be used in the form of DBU, it is preferably used in the form of a weak acid salt thereof from the viewpoint of easy handling. As the weak acid salt of DBU, carbonate, stearate, 2-ethylhexylate, benzoate, salicylate, 3-hydroxy-2-naphthoate, phenol resin salt, 2-mercaptobenzothiazole salt, 2-mercaptobenzimidazole salt, and the like may be exemplified.

A content of the dechlorination crosslinking accelerator is preferably within the range of 0.1-2 parts by mass with respect to 100 parts by mass of the uncrosslinked rubber, from the viewpoint that bleeding hardly occurs and the like. The content is more preferably within the range of 0.3-1.8 parts by mass, and still more preferably within the range of 0.5-1.5 parts by mass.

In order to impart conductivity to the elastic layer 14, a conventionally known conductive agent such as carbon black, graphite, c-$TiO_2$, c-ZnO, c-$SnO_2$ (c-means conductivity), or an ion conductive agent (quaternary ammonium salt, borate, surfactant, or the like) may be appropriately added thereto. In addition, if necessary, various additives may be appropriately added. As the additive, a lubricant, a vulcanization accelerator, an anti-aging agent, a light stabilizer, a viscosity modifier, a processing aid, a flame retardant, a plasticizer, a foaming agent, a filler, a dispersant, a defoamer, a pigment, a releasing agent, and the like may be exemplified.

The elastic layer 14 can be adjusted to have a predetermined volume resistivity by type of crosslinked rubber, amount of ion conductive blended, blending of electronic conductive agent, and the like. The volume resistivity of the elastic layer 14 may be appropriately set in the range of $10^2$-$10^{10}$ Ω·cm, $10^3$-$10^9$ Ω·cm, $10^4$-$10^8$ Ω·cm, or the like, depending on the intended use or the like.

A thickness of the elastic layer 14 is not particularly limited and may be appropriately set in the range of 0.1-10 mm depending on the intended use or the like.

The elastic layer 14 may be produced, for example, as follows. First, the shaft body 12 is disposed coaxially in the hollow portion of a roll forming mold, and an uncrosslinked conductive rubber composition is injected thereinto. Heating and curing (crosslinking) are performed. Then, demolding is performed or the uncrosslinked conductive rubber composition is extruded on the surface of the shaft body 12, so that the elastic layer 14 is formed on an outer periphery of the shaft body 12.

The shaft body 12 is not particularly limited as long as it has conductivity. Specifically, as the shaft body 12, a solid body made of metal such as iron, stainless steel, and aluminum, a core metal having a hollow body, and the like may be exemplified. An adhesive, a primer, or the like may be applied to the surface of the shaft body 12, if necessary. That is, the elastic layer 14 may adhere to the shaft body 12 via an adhesive layer (primer layer). The adhesive, the primer, or the like may be made conductive, if necessary.

According to the charging roll 10 having the above-described configuration, the surface layer 16 includes the large and small particles, in which a difference in particle diameter between the large and small particles is within a specific range; the small-diameter particles 20 are arranged in one layer in the surface layer 16, and the average distance between the small-diameter particles 20 is not more than 1.2 times the average particle diameter of the small-diameter particles 20; the thickness a of the binder resin 22 covering the large-diameter particles 18 and the thickness b of the binder resin 22 covering the small-diameter particles 20 are respectively within specific ranges; and the thickness b is larger than the thickness a, so that it is possible to provide a high-quality image at the end of life even in a high-speed machine having a long life.

The configuration of the charging roll according to the disclosure is not limited to the configuration illustrated in FIG. 1. For example, in the charging roll 10 illustrated in FIG. 1, another elastic layer may be provided between the shaft body 12 and the elastic layer 14. In this case, the other elastic layer is a layer that serves as a base of the charging roll, and the elastic layer 14 functions as a resistance adjusting layer that adjusts resistance of the charging roll. The other elastic layer may be formed of, for example, any of the materials exemplified as materials, each of which constitutes the elastic layer 14. In addition, for example, in the charging roll 10 illustrated in FIG. 1, another elastic layer may be provided between the elastic layer 14 and the surface layer 16. In this case, the elastic layer 14 is a layer that serves as a base of the charging roll, and the other elastic layer functions as a resistance adjusting layer that adjusts resistance of the charging roll, or the like.

EXAMPLES

Hereinafter, the disclosure will be described in detail by way of examples and comparative examples.

Example 1

<Preparation of Conductive Rubber Composition>

A conductive rubber composition was prepared by adding, with respect to 100 parts by mass of hydrin rubber (ECO, "EPICHLOMER CG102" manufactured by DAISO CO., LTD.), 5 parts by mass of a vulcanization aid (zinc oxide, "Type-2 zinc oxide" manufactured by MITSUI MINING & SMELTING CO., LTD), 10 parts by mass of carbon ("Ketjen Black EC 300J" manufactured by KETJEN BLACK INTERNATIONAL COMPANY), 0.5 parts by mass of a vulcanization accelerator (2-mercaptobenzothiazole, "NOCCELER M-P" manufactured by OUCHI SHINKO CHEMICAL INDUSTRIAL CO., LTD.), 2 parts by mass of sulfur ("SULFAX PTC" manufactured by TSURUMI CHEMICAL INDUSTRY CO., LTD.), and 50 parts by mass of a filler (calcium carbonate, "HAKUENKA CC" manufactured by SHIRAISHI KOGYO KAISHA, LTD.), and performing stirring and mixing thereof using a stirrer.

<Production of Elastic Layer>

A core metal (having a diameter of 8 mm) was set in a forming mold (having a pipe shape), and the above-described composition was injected into the forming mold. Heating was performed at 180° C. for 30 minutes. Then, cooling and demolding were performed to form, on an outer periphery of the core metal, an elastic layer that has a thickness of 1.9 mm and is made of a conductive rubber elastic body.

<Production of Surface Layer>

A liquid composition for forming a surface layer was prepared by blending particles and a binder resin so as to have blending amounts (in parts by mass) shown in the table, adding 200 parts by mass of methyl ethyl ketone (MEK) thereto, and performing mixing and stirring at a predetermined stirring speed. Next, the liquid composition was roll-coated on an outer peripheral surface of the elastic layer while adjusting the humidity to low and constant humidity and continuing stirring, and heat treatment was performed to form a surface layer on an outer periphery of the elastic layer. As a result, a charging roll was produced.

Example 2

<Preparation of Conductive Rubber Composition>

A conductive rubber composition was prepared by blending, with respect to 100 parts by mass of NBR ("Nipol DN302" manufactured by NIPPON ZEON CO., LTD.), 0.7 parts by mass of stearic acid ("stearic acid Sakura" manufactured by NOF Corporation), 5 parts by mass of zinc oxide ("Type-2 zinc oxide" manufactured by SAKAI CHEMICAL INDUSTRY CO., LTD.), 2 parts by mass of hydrotalcite ("DHT4A" manufactured by Kyowa Chemical Co., Ltd.), 3 parts by mass of peroxide crosslinking agent ("PERCUMYL D40" manufactured by NOF Corporation), 20 parts by mass of carbon ("Ketjen Black EC 300J" manufactured by KETJEN BLACK INTERNATIONAL COMPANY), and performing stirring and mixing thereof using a stirrer.

<Production of Elastic Layer>

A core metal (having a diameter of 8 mm) was set in a forming mold, and the above-described composition was injected into the forming mold. Heating was performed at 170° C. for 30 minutes. Then, cooling and demolding were performed to form, on an outer periphery of the core metal, an elastic layer that has a thickness of 1.9 mm and is made of a conductive rubber elastic body.

<Production of Surface Layer>

A liquid composition for forming a surface layer was prepared by blending particles and a binder resin so as to have blending amounts (in parts by mass) shown in the table, adding 200 parts by mass of methyl ethyl ketone (MEK) thereto, and performing mixing and stirring at a predetermined stirring speed. Next, the liquid composition was roll-coated on an outer peripheral surface of the elastic layer while adjusting the humidity to low and constant humidity and continuing stirring, and heat treatment was performed to form a surface layer on an outer periphery of the elastic layer. As a result, a charging roll was produced.

Example 3

<Preparation of Conductive Rubber Composition>

A conductive rubber composition was prepared by adding, with respect to 100 parts by mass of ethylene-propylene-diene rubber ("EPT 4045" manufactured by Mitsui Chemicals, Inc.), 5 parts by mass of zinc oxide ("Type-2 zinc oxide" manufactured by SAKAI CHEMICAL INDUSTRY CO., LTD.), 1 part by mass of stearic acid ("stearic acid Sakura" manufactured by NOF Corporation), 30 parts by mass of process oil ("Diana Process Oil PW-380" manufactured by Idemitsu Kosan Co., Ltd.), 1 part by mass of sulfur (manufactured by Tsurumi Chemical Industry Co., ltd.), 2 parts by mass of dibenzothiazyl disulfide (vulcanization accelerator) ("Noxeller DM-P" manufactured by OUCHI SHINKO CHEMICAL INDUSTRIAL CO., LTD.), 1 part by mass of tetramethylthiuram monosulfide (vulcanization accelerator) ("Noxeller TS" manufactured by OUCHI SHINKO CHEMICAL INDUSTRIAL CO., LTD.), and 15 parts by mass of carbon ("Ketjen Black EC 300J" manufactured by KETJEN BLACK INTERNATIONAL COMPANY), and performing kneading thereof using a kneader.

<Production of Elastic Layer>

A core metal (having a diameter of 8 mm) was set in a forming mold, and the above-described composition was injected into the forming mold. Heating was performed at 160° C. for 40 minutes. Then, cooling and demolding were performed to form, on an outer periphery of the core metal, an elastic layer that has a thickness of 1.9 mm and is made of a conductive rubber elastic body.

<Production of Surface Layer>

A liquid composition for forming a surface layer was prepared by blending particles and a binder resin so as to have blending amounts (in parts by mass) shown in the table, adding 200 parts by mass of methyl ethyl ketone (MEK) thereto, and performing mixing and stirring at a predetermined stirring speed. Next, the liquid composition was roll-coated on an outer peripheral surface of the elastic layer while adjusting the humidity to low and constant humidity and continuing stirring, and heat treatment was performed to form a surface layer on an outer periphery of the elastic layer. As a result, a charging roll was produced.

Examples 4 to 8, and Comparative Examples 1, 3, 4, 7, 9, and 10

An elastic layer including ECO as rubber was produced in the same manner as in Example 1. Next, a liquid composition for forming a surface layer was prepared by blending particles and a binder resin so as to have blending amounts (in parts by mass) shown in the table, adding 200 parts by mass of methyl ethyl ketone (MEK) thereto, and performing mixing and stirring at a predetermined stirring speed. Next, the liquid composition was roll-coated on an outer peripheral surface of the elastic layer while adjusting the humidity to low and constant humidity and continuing stirring, and heat treatment was performed to form a surface layer on an outer periphery of the elastic layer. As a result, each charging roll was produced.

Example 9, and Comparative Examples 2 and 6

An elastic layer including NBR as rubber was produced in the same manner as in Example 2. Next, a liquid composition for forming a surface layer was prepared by blending particles and a binder resin so as to have blending amounts (in parts by mass) shown in the table, adding 200 parts by mass of methyl ethyl ketone (MEK) thereto, and performing mixing and stirring at a predetermined stirring speed. Next, the liquid composition was roll-coated on an outer peripheral surface of the elastic layer while adjusting the humidity to low and constant humidity and continuing stirring, and heat treatment was performed to form a surface layer on an outer periphery of the elastic layer. As a result, each charging roll was produced.

Comparative Examples 5 and 8

An elastic layer including EPDM as rubber was produced in the same manner as in Example 3. Next, a liquid composition for forming a surface layer was prepared by blending particles and a binder resin so as to have blending amounts (in parts by mass) shown in the table, adding 200 parts by mass of methyl ethyl ketone (MEK) thereto, and performing mixing and stirring at a predetermined stirring speed. Next, the liquid composition was roll-coated on an outer peripheral surface of the elastic layer while adjusting the humidity to low and constant humidity and continuing stirring, and heat treatment was performed to form a surface layer on an outer periphery of the elastic layer. As a result, each charging roll was produced.

The following materials were used as a material for the surface layer.

Binder resin (PU): "BURNOCK DF-407" manufactured by DIC corporation
Binder resin (PA): "ACRYDIC A-1300" manufactured by DIC corporation
Binder resin (PMMA): "PARACRON W197C" manufactured by Negami Chemical Industrial Co., Ltd.
Binder resin (PC): "TARFLON A1700" manufactured by Idemitsu Kosan Co., Ltd.

(Large-Diameter Particles)

Urethane particles (PU<1>): "ART PEARL C-100" manufactured by Negami Kogyo Co., Ltd., average particle diameter of 50 μm, surface roughness Ra=0.08 μm
Urethane particles (PU<2>): "ART PEARL C-400 transparent" manufactured by Negami Kogyo Co., Ltd., average particle diameter of 15 μm, surface roughness Ra=0.07 μm
Nylon particles (PA<1>): "PSP-50" manufactured by Dantec Dynamics A/S, average particle diameter of 50 μm, surface roughness Ra=0.16 μm
Nylon particles (PA<2>): "Orgasol 2002ES3NAT3" manufactured by Arkema Co., average particle diameter of 30 μm, surface roughness Ra=0.28 μm
Acrylic particles (PMMA <1>): "MX-3000" manufactured by Soken Chemical & Engineering Co., Ltd., average particle diameter of 30 μm, surface roughness Ra=0.08 μm
Acrylic particles (PMMA <2>): "MX-2000" manufactured by Soken Chemical & Engineering Co., Ltd., average particle diameter of 20 μm, surface roughness Ra=0.08 μm
Acrylic particles (PMMA <3>): "MX-1500H" manufactured by Soken Chemical & Engineering Co., Ltd., average particle diameter of 15 μm, surface roughness Ra=0.08 μm
Silica particles (SILICA <1>): "SUNSPHERE NP-200" manufactured by AGC Si-Tech Co., Ltd., average particle diameter of 20 μm, surface roughness Ra=0.06 μm (Small-Diameter Particles)

Urethane particles (PU<3>): "ART PEARL C-800 transparent" manufactured by Negami Kogyo Co., Ltd., average particle diameter of 5 μm, surface roughness Ra=0.07 μm
Nylon particles (PA<3>): "FLOWBEADS NP-U (classified product)" manufactured by SUMITOMO SEIKA CHEMICAL CO., LTD., average particle diameter of 15 μm, surface roughness Ra=0.11 μm
Nylon particles (PA<4>): "FLOWBEADS NP-U (classified product)" manufactured by SUMITOMO SEIKA CHEMICAL CO., LTD., average particle diameter of 5 μm, surface roughness Ra=0.11 μm
Nylon particles (PA<5>): "Orgasol 2001UDNAT1" manufactured by Arkema Co., average particle diameter of 5 μm, surface roughness Ra=0.29 μm
Acrylic particles (PMMA <4>): "MX-1000" manufactured by Soken Chemical & Engineering Co., Ltd., average particle diameter of 10 μm, surface roughness Ra=0.08 μm
Acrylic particles (PMMA <5>): "MX-500" manufactured by Soken Chemical & Engineering Co., Ltd., average particle diameter of 5 μm, surface roughness Ra=0.08 μm
Acrylic particles (PMMA <6>): "MX-300" manufactured by Soken Chemical & Engineering Co., Ltd., average particle diameter of 3 μm, surface roughness Ra=0.08 μm
Silica particles (SILICA <2>): "SUNSPHERE NP-30" manufactured by AGC Si-Tech Co., Ltd., average particle diameter of 3 μm, surface roughness Ra=0.06 μm Liquid viscosity at 18° C. of each liquid composition for forming a surface layer was measured using "VISCOMETER TVB-10" manufactured by Toki Sangyo Co., Ltd.

Each measurement was performed on the surface layer of each of the produced charging rolls. Then, an image evaluation was performed on each of the produced charging rolls. The evaluation results and blending components of the surface layer forming composition are shown in the table below.

(Binder Thickness)

Measurement was performed by observing a radial cross section of the surface layer at a magnification of 400× using a laser microscope ("VK-X100" manufactured by KEYENCE CORPORATION). As illustrated in FIG. 3, the binder thickness a on the large-diameter particles and the binder thickness b on the small-diameter particles were measured. The binder thicknesses a and b were measured at five places in any positions and expressed by calculating the averages thereof.

(Arrangement of Particles)

The surface of each roll was observed at a magnification of 400× using a laser microscope ("VK-X100" manufactured by KEYENCE CORPORATION), to identify the presence or absence of overlapping of the small-diameter particles. A case where no overlapping of the small-diameter particles is observed was designated as "one layer", and a case where overlapping of the small-diameter particles is observed was designated as "multi-layer".

(Average Distance d Between Small-Diameter Particles)

The average distance d between the small-diameter particles was expressed by taking a surface photograph of the surface layer, measuring a distance between the small-diameter particles at any five places in which the measurement is made three times for each place, and calculating the average of the 15 scores in total.

(Particle Surface Roughness Ra)

The particle surface was scanned 1 μm with a scanning probe microscope ("AFM5100N" manufactured by Hitachi High-Tech Science Corporation) using a cantilever "SI-DF3" in DFM mode, to derive the line roughness Ra.

(Image Evaluation: Horizontal Stripes)

The produced charging roll was incorporated into a Konica Minolta multifunction device "bizhub C658." 550,000 sheets were printed in a ruled line mode with a print density of 1% under a 10° C.×10% RH environment, and then halftone images with a print density of 25% were printed. A case where no image with horizontal stripes is identified was designated very good "⊚"; a case where an image with horizontal stripes is slightly identified and is within an allowable range was designated good "○"; and a case where an image with horizontal stripes is clearly identified was designated poor "x."

(Image Evaluation: Unevenness)

The produced charging roll was incorporated into a Konica Minolta multifunction device "bizhub C658." 550,000 Sheets were printed in a ruled line mode with a print density of 1% under a 10° C.×10% RH environment, and then halftone images with a print density of 25% were printed. A case where no image with unevenness is identified was designated very good "⊚"; a case where an image with unevenness is slightly identified and is within an allowable range was designated good "○"; and a case where an image with unevenness is clearly identified was designated poor "x."

(Image Evaluation: Fog)

The produced charging roll was incorporated into a Konica Minolta multifunction device "bizhub C658." 550,000 Sheets were printed in a ruled line mode with a print density of 1% under a 10° C.×10% RH environment, and then halftone images with a print density of 25% were printed. A case where no image with fog is identified was designated very good "⊚"; a case where an image with fog is slightly identified and is within an allowable range was designated good "○"; and a case where an image with fog is clearly identified was designated poor "x."

(Image Evaluation: Black Dots)

The produced charging roll was incorporated into a Konica Minolta multifunction device "bizhub C658." 550,000 Sheets were printed in a ruled line mode with a print density of 1% under a 10° C.×10% RH environment, and then halftone images with a print density of 25% were printed. A case where no image with black dots is identified was designated very good "⊚"; a case where an image with black dots is slightly identified and is within an allowable range was designated good "○"; and a case where an image with black dots is clearly identified was designated poor "x."

(Stain)

The produced charging roll was incorporated into a Konica Minolta multifunction device "bizhub C658." 550,000 Sheets were printed in a ruled line mode with a print density of 1% under a 10° C.×10% RH environment, and then the appearance of the roll was visually observed. At this time, a case where a stain of a white external additive is attached to the entire surface of the roll and is in an amount that clearly causes a defective image was designated poor "x"; a case where although very small amount of a stripe-like stain is attached to the surface of the roll, the stain is a stain to which a slight amount of white external additive is attached and is in an amount that does not cause a defective image was designated good "○"; and a case where no stripe-like stain is generated on the surface of the roll was designated best "⊚."

TABLE 1

| | | Particle diameter (μm) | Surface roughness Ra (μm) | Example 1 | 2 | 3 | 4 | 5 | 6 | 7 | 8 | 9 | Comparative Example 1 | 2 | 3 | 4 | 5 | 6 | 7 | 8 | 9 | 10 |
|---|---|---|---|---|---|---|---|---|---|---|---|---|---|---|---|---|---|---|---|---|---|---|
| Elastic layer (type of rubber) | | | | ECO | NBR | EPDM | ECO | ECO | ECO | ECO | ECO | NBR | ECO | NBR | ECO | ECO | EPDM | NBR | ECO | EPDM | ECO | ECO |
| Blending components for surface layer material | Binder | PU | | 100 | — | — | — | — | — | — | — | 100 | — | 100 | 100 | 100 | 100 | 100 | 100 | — | — | 100 |
| | | PA | | — | 100 | — | — | — | — | — | — | — | — | — | — | — | — | — | — | — | — | — |
| | | PMMA | | — | — | 100 | — | — | — | — | — | — | — | — | — | — | — | — | — | — | — | — |
| | | PC | | — | — | — | 100 | 100 | 100 | 100 | 100 | — | 100 | — | — | — | — | — | — | 100 | 100 | 100 |
| | Large-diameter particles | PU<1> | 50 | 0.08 | 20 | — | — | — | — | — | — | — | — | 20 | — | — | — | — | — | — | — | — | — |
| | | PU<2> | 15 | 0.07 | — | 20 | — | — | — | — | — | — | — | — | — | — | — | — | — | — | — | — | — |
| | | PA<1> | 50 | 0.16 | — | — | 20 | — | — | — | — | — | — | — | — | — | — | — | — | — | — | — | — |
| | | PA<2> | 30 | 0.28 | — | — | — | 20 | — | — | — | — | — | — | — | 20 | — | — | — | — | — | — | — |
| | | PMMA<1> | 30 | 0.08 | — | — | — | — | 20 | 20 | 20 | 20 | — | 20 | — | — | 20 | — | 20 | — | — | 20 | 20 |
| | | PMMA<2> | 20 | 0.08 | — | — | — | — | — | — | — | — | 20 | — | — | — | — | — | — | — | — | — | — |
| | | PMMA<3> | 15 | 0.08 | — | — | — | — | — | — | — | — | — | — | 20 | — | — | — | — | — | — | — | — |
| | | SILICA<1> | 20 | 0.06 | — | — | — | — | — | — | — | — | — | — | — | — | — | — | — | — | — | — | — |
| | Small-diameter particles | PU<3> | 5 | 0.07 | — | 80 | — | — | — | — | — | — | — | — | 80 | — | — | — | — | — | — | — | — |
| | | PA<3> | 15 | 0.11 | — | — | 80 | — | — | — | — | — | — | — | — | — | — | 80 | — | — | — | — | — |
| | | PA<4> | 5 | 0.11 | — | — | — | 60 | 80 | 80 | 80 | 80 | — | — | — | — | 80 | — | — | 80 | — | — | — |
| | | PA<5> | 5 | 0.29 | — | — | — | — | — | — | — | — | — | — | — | — | — | — | — | — | — | — | — |
| | | PMMA<4> | 10 | 0.08 | 80 | — | — | — | — | — | — | — | — | 80 | 80 | 80 | — | — | — | — | 50 | 80 | 80 |
| | | PMMA<5> | 5 | 0.08 | — | — | — | — | — | — | — | — | 80 | — | — | — | — | — | — | 80 | — | — | — |
| | | PMMA<6> | 3 | 0.08 | — | — | — | — | — | — | — | — | — | — | — | — | — | — | — | — | — | — | — |
| | | SILICA<2> | 3 | 0.06 | — | — | — | — | — | — | — | — | — | — | — | — | — | — | — | — | — | — | — |
| Stirring speed (rpm) | | | | 465 | 465 | 465 | 465 | 465 | 465 | 465 | 350 | 465 | 465 | 465 | 465 | 350 | 465 | 465 | 465 | 465 | 465 | 100 |
| Liquid viscosity of surface layer material (18° C.) | | | | 60 | 55 | 35 | 60 | 60 | 35 | 80 | 30 | 60 | 40 | 85 | 95 | 50 | 60 | 60 | 60 | 60 | 60 | 30 |
| Difference in particle diameter between large-diameter particles (μm) | | | | 25 | 10 | 35 | 25 | 15 | 25 | 17 | 20 | 25 | 20 | 5 | 17 | 25 | 45 | 25 | 17 | 25 | 25 | 25 |
| Binder thickness (on large-diameter particles) (μm) | | | | 2.4 | 3.1 | 1.9 | 2.4 | 3.5 | 1.5 | 3.5 | 1.5 | 2.7 | 1.2 | 3.6 | 4.0 | 1.2 | 1.8 | 2.4 | 2.3 | 2.4 | 2.4 | 3.5 |
| Binder thickness (on small-diameter particles) (μm) | | | | 4.1 | 4.0 | 3.2 | 4.1 | 4.1 | 3.6 | 6.0 | 3.0 | 4.4 | 2.3 | 3.8 | 6.5 | 3.3 | 4.0 | 3.7 | 3.1 | 3.3 | 3.6 | 3.0 |
| Arrangement of particles (one layer/multi-layer) | | | | One layer | One layer | One layer | One layer | One layer | One layer | One layer | One layer | One layer | One layer | One layer | One layer | One layer | One layer | Multi-layer | Multi-layer | One layer | Multi-layer | One layer |
| Distance d between small-diameter particles (μm) | | | | 5.4 | 5.8 | 16.1 | 6.0 | 5.4 | 5.4 | 3.2 | 11.0 | 5.3 | 11.0 | 11.0 | 3.2 | 5.4 | 16.1 | Aggregation | Aggregation | 6.4 | Aggregation | 5.4 |
| Distance d/diameter of small-diameter particles | | | | 1.1 | 1.2 | 1.1 | 1.2 | 1.1 | 1.1 | 1.1 | 1.1 | 1.1 | 1.1 | 1.1 | 1.1 | 1.1 | 1.1 | — | — | 1.3 | — | 1.1 |
| Evaluation | Horizontal stripes | | | ◎ | ○ | ◎ | ◎ | ◎ | ◎ | ◎ | ○ | ◎ | × | × | × | ◎ | ◎ | ◎ | ◎ | ◎ | ◎ | ◎ |
| | Unevenness | | | ◎ | ◎ | ○ | ◎ | ◎ | ◎ | ◎ | ◎ | ○ | ◎ | ◎ | ◎ | ◎ | × | ◎ | ◎ | ◎ | ◎ | ◎ |
| | Fog | | | ◎ | ◎ | ◎ | ◎ | ◎ | ◎ | ◎ | ◎ | ◎ | ◎ | ◎ | ◎ | ◎ | ◎ | ◎ | ◎ | × | ◎ | ◎ |
| | Stain | | | ◎ | ◎ | ◎ | ◎ | ◎ | ◎ | ◎ | ◎ | ◎ | ◎ | ◎ | ◎ | ◎ | ◎ | × | × | ◎ | × | ◎ |
| | Black dots | | | ◎ | ◎ | ◎ | ◎ | ◎ | ○ | ◎ | ◎ | ◎ | × | ◎ | ◎ | × | ◎ | × | × | ◎ | × | × |

In Comparative Example 1, since the binder thickness a on the large-diameter particles was too small, the optimum distance to the photoconductor was not maintained due to wear over time, and thus an image with black dots was identified. In addition, since the binder thickness b on the small-diameter particles was too small, resistance at discharge places became non-uniform, and thus an image with horizontal stripes was identified. In Comparative Example 2, since the difference in particle diameter between the large and small particles was too small, the optimum discharge distance was not maintained, and thus an image with horizontal stripes was identified. In Comparative Example 3, since the binder thickness a on the large-diameter particles was too large, insufficient discharge and poor charging occurred due to an increase in nip area with the photoconductor, and thus an image with horizontal stripes was identified. In addition, since the binder thickness b on the small-diameter particles was too large, a discharge region could not be secured, and thus an image with unevenness was identified. In Comparative Example 4, since the binder thickness a on the large-diameter particles was too small, the optimum distance to the photoconductor was not maintained due to wear over time, and thus an image with black dots was identified. In Comparative Example 5, the difference in particle diameter between the large and small particles was too large, the optimum discharge distance was not maintained, and thus an image with fog was identified. In Comparative Example 6, different materials were used for the large and small particles, and the large and small particles aggregated, so that the small-diameter particles were arranged in multi-layer in the surface layer. Thus, an image with black dots was identified. In Comparative Example 7, the large and small particles were made of silica particles, and the large and small particles aggregated, so that the small-diameter particles were arranged in multi-layer in the surface layer. Thus, an image with black dots was identified. In Comparative Example 8, since the distance between the small-diameter particles was too wide, a stain was identified on the roll surface. In Comparative Example 9, different materials were used for the large and small particles, and the large and small particles aggregated, so that the small-diameter particles were arranged in multi-layer in the surface layer. Thus, an image with black dots was identified. In Comparative Example 10, the thickness b was not larger than the thickness a. Therefore, an image with black dots was identified.

On the contrary, in the examples, the difference in particle diameter between the large and small particles was 10-35 µm; the small-diameter particles were arranged in one layer in the surface layer, and the average distance between the small-diameter particles was not more than 1.2 times the average particle diameter of the small-diameter particles; the binder thickness a on the large-diameter particles was within the range of 1.5-3.5 µm; the binder thickness b on the small-diameter particles was within the range of 3.0-6.0 µm; and the thickness b was larger than the thickness a. From these results, it can be seen that abnormal images such as an image with horizontal stripes, an image with unevenness, and an image with fog are suppressed even for a long period of use, which makes it possible to provide a high-quality image at the end of life even in a high-speed machine having a long life.

Hereinbefore, the embodiments and examples of the disclosure have been described. However, the disclosure is not limited to the above-described embodiments and examples, and various modifications can be made within a range that does not depart from the gist of the disclosure.

What is claimed is:

1. A charging roll for electrophotographic equipment, comprising:
    a shaft body;
    an elastic layer formed on an outer periphery of the shaft body; and
    a surface layer formed on an outer periphery of the elastic layer,
    wherein the surface layer comprises a binder resin, large-diameter particles having an average particle diameter of 15-50 µm, and small-diameter particles having an average particle diameter of 3-15 µm,
    a surface roughness Ra of the large-diameter particles and the small-diameter particles is 0.25 µm or less,
    a difference in average particle diameter between the large-diameter particles and the small-diameter particles is 10-35 µm,
    the small-diameter particles are arranged in one layer in the surface layer, and the average distance between the small-diameter particles is not more than 1.2 times the average particle diameter of the small-diameter particles,
    the thickness a of the binder resin covering the large-diameter particles is within the range of 1.5-3.5 µm,
    the thickness b of the binder resin covering the small-diameter particles is within the range of 3.0-6.0 µm, and
    the thickness b is larger than the thickness a,
    the large-diameter particles and the small-diameter particles are made of the same material, and a material of the large-diameter particles and the small-diameter particles is different from a material of the binder resin,
    the material of the large-diameter particles and the small-diameter particles is any one of polyurethane, polyamide, acrylic resin, and polycarbonate,
    the material of the binder resin is any one or more of polyurethane, polyamide, acrylic resin, and polycarbonate,
    a content of the small-diameter particles is within the range of 60-110 parts by mass with respect to 100 parts by mass of the binder resin.

* * * * *